(12) United States Patent
Patzwaldt

(10) Patent No.: US 11,538,231 B2
(45) Date of Patent: Dec. 27, 2022

(54) PROJECTING IMAGES CAPTURED USING FISHEYE LENSES FOR FEATURE DETECTION IN AUTONOMOUS MACHINE APPLICATIONS

(71) Applicant: NVIDIA Corporation, Santa Clara, CA (US)

(72) Inventor: Karsten Patzwaldt, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 121 days.

(21) Appl. No.: 16/841,577

(22) Filed: Apr. 6, 2020

(65) Prior Publication Data

US 2021/0312203 A1 Oct. 7, 2021

(51) Int. Cl.
| | |
|---|---|
| *G06V 10/00* | (2022.01) |
| *G06V 10/24* | (2022.01) |
| *G06T 7/73* | (2017.01) |
| *G01C 21/26* | (2006.01) |
| *G05D 1/02* | (2020.01) |
| *G06K 9/62* | (2022.01) |
| *G06N 3/08* | (2006.01) |
| *H04N 5/232* | (2006.01) |
| *H04N 5/262* | (2006.01) |
| *G06V 10/40* | (2022.01) |
| *G06V 20/56* | (2022.01) |

(52) U.S. Cl.
CPC ............ *G06V 10/24* (2022.01); *G01C 21/265* (2013.01); *G05D 1/0221* (2013.01); *G05D 1/0246* (2013.01); *G06K 9/6232* (2013.01); *G06K 9/6256* (2013.01); *G06N 3/08* (2013.01); *G06T 7/73* (2017.01); *G06V 10/40* (2022.01); *G06V 20/56* (2022.01); *H04N 5/23238* (2013.01); *H04N 5/2628* (2013.01); *G05D 2201/0213* (2013.01); *G06T 2207/20081* (2013.01); *G06T 2207/30252* (2013.01)

(58) Field of Classification Search
CPC combination set(s) only.
See application file for complete search history.

(56) References Cited

U.S. PATENT DOCUMENTS

| | | |
|---|---|---|
| 10,885,698 B2 | 1/2021 | Muthler et al. |
| 2017/0140542 A1 | 5/2017 | Hodohara |
| | (Continued) | |

OTHER PUBLICATIONS

Plaut et al, Monocular 3D Object Detection in Cylindrical Images from Fisheye Cameras, arXiv 2003.03759v1 Mar. 8, 2020.*

(Continued)

*Primary Examiner* — Nancy Bitar
*Assistant Examiner* — Xiao Liu
(74) *Attorney, Agent, or Firm* — Taylor English Duma L.L.P.

(57) ABSTRACT

In various examples, sensor data may be adjusted to represent a virtual field of view different from an actual field of view of the sensor, and the sensor data—with or without virtual adjustment—may be applied to a stereographic projection algorithm to generate a projected image. The projected image may then be applied to a machine learning model—such as a deep neural network (DNN)—to detect and/or classify features or objects represented therein.

20 Claims, 13 Drawing Sheets

(56) References Cited

U.S. PATENT DOCUMENTS

| | | | |
|---|---|---|---|
| 2019/0189160 A1* | 6/2019 | Huang | H04N 5/9201 |
| 2021/0358150 A1* | 11/2021 | Lin | G01S 17/894 |

OTHER PUBLICATIONS

Jabar et al, Perceptual Analysis of Perspective Projection for Viewport Rendering in 360° Images, 2017 IEEE International Symposium on Multimedia (ISM), Dec. 11-13, 2017.*

Friel et al, Automatic calibration of fish-eye cameras from automotive video sequences, IET Intell. Transp. Syst., 2010, vol. 4, Iss. 2, pp. 136-148 (Year: 2010).*

Kannala et al, A general Camera Calibration Method for Fish-Eye Lenses, Proc. 17th ICPR'04 (Year: 2004).*

Plaut, E., et al., "Monocular 3D Object Detection in Cylindrical Images from Fisheye Cameras", Cornell University Library, pp. 17, Mar. 8, 2020.

Wenyan, Y. et al., "Object Detection in Equirectangular Panorama", 24th International Conference on Pattern Recognition (ICPR), IEEE, pp. 6, 2018.

International Search Report and written opinion received for PCT Patent Application No. PCT/US2021/023508, dated Jun. 30, 2021, 17 pages.

Snyder, John Parr. Map projections—A working manual. vol. 1395. US Government Printing Office, 1987. pp. 3-7, 154-163, 164-168.

Casselman, Bill. "Stereographic Projection." American Mathematical Society: Feature Column. 13 pages. Retrieved from the Internet on Feb. 19, 2020 at http://www.ams.org/publicoutreach/feature-column/fc-2014-02.

Coors, Benjamin, Alexandru Paul Condurache, and Andreas Geiger. "Spherenet: Learning spherical representations for detection and classification in omnidirectional images." Proceedings of the European Conference on Computer Vision (ECCV). 2018. 16 pages.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

International Preliminary Report on Patentability for PCT Application No. PCT/US2021/023508, filed Mar. 22, 2021, dated Oct. 20, 2022, 10 pgs.

* cited by examiner

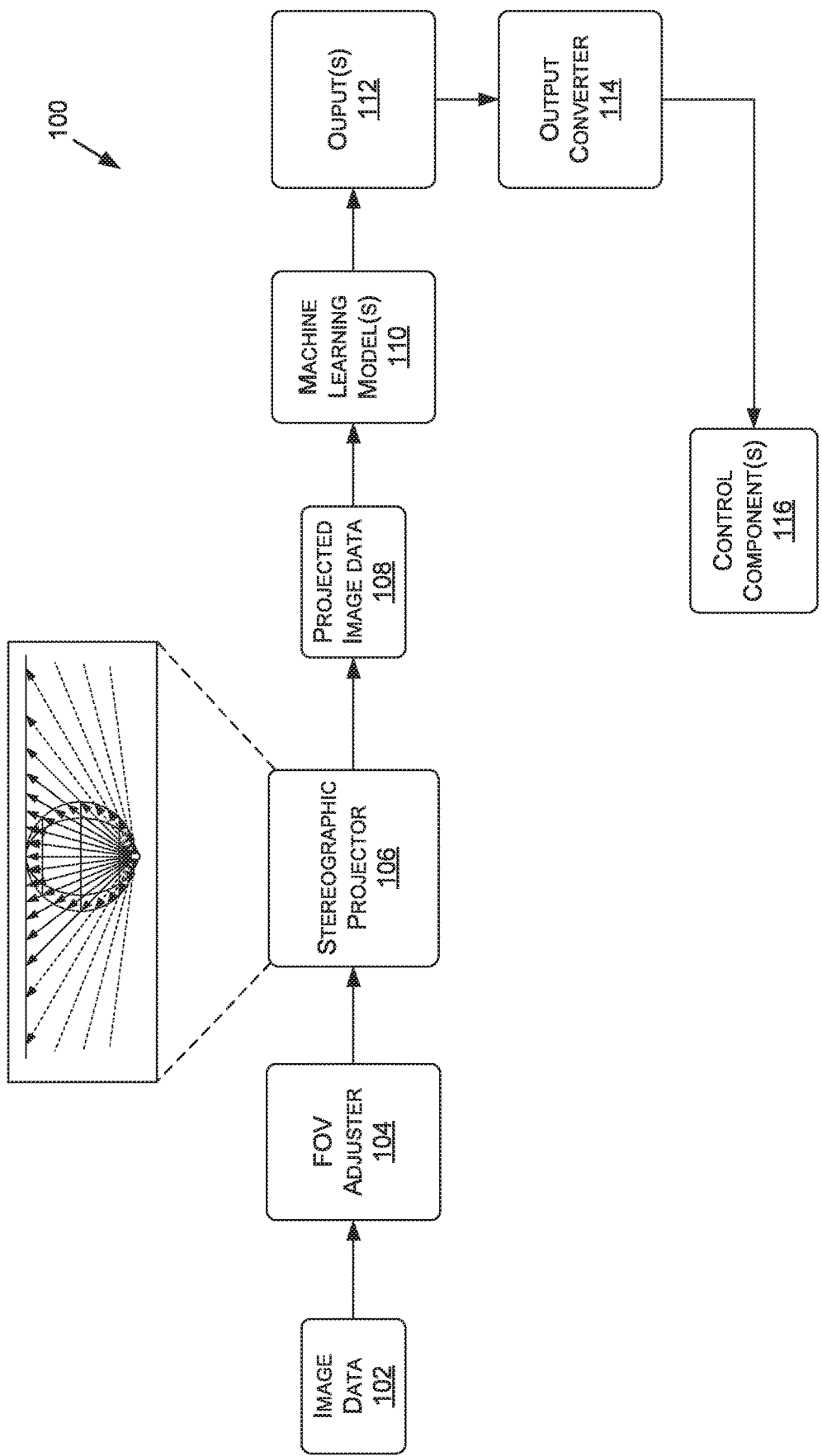

PROJECTING IMAGES CAPTURED USING FISHEYE LENSES FOR FEATURE DETECTION IN AUTONOMOUS MACHINE APPLICATIONS

BACKGROUND

Autonomous driving systems and advanced driver assistance systems (ADAS) may leverage various sensors to perform various tasks—such as lane keeping, lane changing, lane assignment, camera calibration, turning, stopping, path planning, and localization. For example, for autonomous and ADAS systems to operate independently and efficiently, an understanding of the surrounding environment of the vehicle in real-time or near real-time may be generated. This understanding may include information as to locations of objects, obstacles, lane markers, signs, and/or traffic lights in the environment, which provide context and visual indicia for various demarcations, such as lanes, road boundaries, intersections, and/or the like. The information of the surrounding environment may be used by a vehicle when making decisions, such as a path to travel in view of the various objects (e.g., vehicles, pedestrians, bicyclists, etc.) in the environment, when and if to change lanes, how fast to drive, where to stop at an intersection, and/or the like.

As an example, information regarding locations and attributes of objects and/or lanes in an environment of an autonomous or semi-autonomous vehicle may prove valuable when performing path planning, obstacle avoidance, and/or control decisions. Machine learning models and/or computer vision algorithms are often trained or programmed to generate information of the surrounding environment of a vehicle. For example, these machine learning models (e.g., deep neural networks (DNNs)) and/or computer vision algorithms are trained to generate an understanding of the surrounding environment represented by sensor data (e.g., images) generated by sensors with varying fields of view. For example, many DNNs may be trained using sensors (e.g., image sensors) with fields of view between 60 and 120 degrees. However, at least some sensors (e.g., cameras, LIDAR sensors, RADAR sensors, etc.) of a vehicle may have a field of view greater than 120 degrees—such as parking cameras positioned to a rear or front of a vehicle, or side-view cameras positioned on side-view mirrors of a vehicle. For example, parking cameras often employ fisheye cameras with fields of view of upwards of or greater than 190 degrees. As a result, image data generated by these image sensors having wide fields of view may not be suitable for processing by DNNs—e.g., due to distortion, artifacts, and/or other imperfections.

In conventional systems, objects of a vehicle's environment may be detected using a DNN trained to detect features represented by training image data generated using image sensors having fields of view of less than 120 degrees. For example, pinhole cameras—often used for forward-facing cameras (known as "dash cameras" or "dash cams," colloquially) and rear-facing cameras—are examples of image sensors with a typically narrower fields of view. Images captured by such image sensors have minimal distortion, as the images are largely rectilinear, and images generated by such cameras may be used to train the DNN to detect features of an environment. However, image data captured by parking cameras (e.g., fisheye cameras) with a higher degree field of view (e.g., greater than 120 degrees) may include distortion in areas where limited information is available (e.g., edges of the images), and thus may result in inaccurate computations by a DNN. As such, conventional approaches may retrain the DNN using image data captured by sensors with greater fields of view, which not only requires significant computational cost and manual effort, but also limits the scalability and adaptability of the DNN for sensor data representing smaller fields of view (e.g., less than 120 degrees). As a result, these conventional systems require training various instances of DNNs such that each instance of the DNN corresponds to a particular field of view—e.g., a first instance for a field of view of 90-120 degrees and a second instance for a field of view of 120-180 degrees. In addition, even where the DNN is trained specifically for wider fields of view, due to the variance in both scales and angles of distortion in image data from wide-view sensors, labeling features for ground truth may be difficult due to the skewed orientation of the features (e.g., object, lines) in the image. For example, features such as lines and shapes in image-space may not align with the locations of the same in world-space, adding another layer of complexity for the DNN and/or post-processing to accurately coordinate outputs of the DNN with real-world locations of features. Without an accurate mapping of outputs to world-space locations, the DNN may not be as reliable for performing operations in a technology space as safety critical as autonomous driving.

SUMMARY

Embodiments of the present disclosure relate to stereographically projecting images captured using fisheye lenses for feature detection using neural networks. Systems and methods are disclosed that leverage existing neural networks trained on outputs captured using narrower field of view sensors (e.g., sensors with fields of view less than 120 degrees) to detect features in outputs from wider field of view sensors (e.g., sensors with fields of view greater than 120 degrees) in real-time or near real-time.

In contrast to conventional systems, such as those described above, the systems and methods of the present disclosure may leverage live perception of wide field of view sensors (e.g., greater than 120 degrees) to detect one or more features in a vehicle's environment. For example, an image from a wide field of view sensor may be applied to a stereographic projection algorithm to project the image onto a two-dimensional (2D) plane. The projected image may then be leveraged to detect features in the vehicle's environment using a neural network trained to detect features in images captured by narrower field of view sensors. In some examples, the field of view of the wide field of view sensor may be virtually adjusted to generate an updated image with the virtually adjusted field of view prior to applying the image to the stereographic projection algorithm. The field of view of the wide field of view sensor may be vertically adjusted such that the virtual center of the sensor (e.g., a camera center-point) substantially aligns with a horizon. In some other examples, the detected features may be converted to image-space locations and corresponding world-space locations. For example, the outputs may be used to directly or indirectly (e.g., via decoding) to determine locations of each feature, classification of each feature, and/or the like.

As a result of using existing neural networks—e.g., DNNs trained using lower field of view images—to detect features in outputs of high field of view images, the additional compute and time resources for training a new neural network or retraining of the pre-trained neural network for wide field of view image sensors is not required. As such, the process of detecting features in images captured using wide field of view sensors may be comparatively less time-consuming, less computationally intense, and more scalable as the system may learn to detect features in real-time or near real-time, without requiring prior experience, training, or knowledge of the environment and the field of view of the sensors.

BRIEF DESCRIPTION OF THE DRAWINGS

The present systems and methods for stereographically projecting images captured using fisheye lenses for feature detection are described in detail below with reference to the attached drawing figures, wherein:

FIG. 1A is an example data flow diagram illustrating an example process for detecting features of a vehicle's environment using outputs from one or more sensors of the vehicle, in accordance with some embodiments of the present disclosure;

DETAILED DESCRIPTION

Figure 1B:
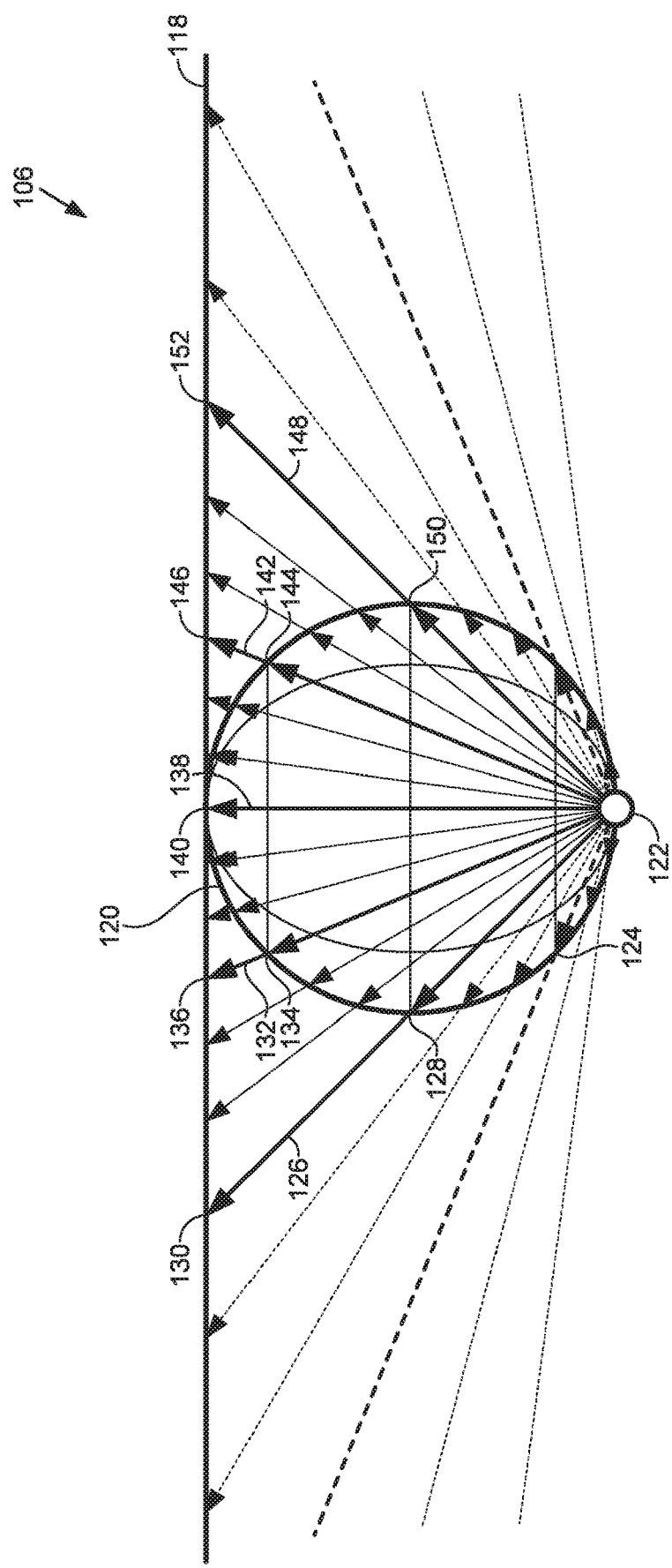
FIG. 1B depicts an illustration of an example of projecting an original image onto a 2D projection plane using a virtual sphere to generate a projected image, in accordance with some embodiments of the present disclosure.

Systems and methods are disclosed related to stereographically projecting images captured using fisheye lenses for feature detection using neural networks. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with feature detection and classification for vehicle applications, this is not intended to be limiting, and the systems and methods described herein may be used in augmented reality, virtual reality, robotics, security and surveillance, autonomous or semi-autonomous machine applications, and/or any other technology spaces where wide field of view sensors are deployed and may be leveraged for performing various operations—e.g., object and/or feature detection or classification.

As described herein, in contrast to conventional approaches, the current systems and methods provide techniques to detect features in images captured by wide field of view sensors (e.g., sensors with fields of view greater than 120 degrees) using—in embodiments—an existing deep neural network (DNN) trained on images captured using narrower field of view sensors (e.g., sensors with fields of view less than 120 degrees) in real-time or near real-time. As such, live perception from wide field of view sensors may be leveraged to detect features (e.g., objects, lanes, pedestrians) in images of the environment of the vehicle. In some embodiments, image data from a wide field of view sensor may be projected onto a two-dimensional target plane to generate stereographically projected images that have lower distortions where less information is available—e.g., on the edges of the images. The image data, after stereographic projection, may be applied to an existing DNN that was trained on sensor data representative of narrower fields of view, such that retraining of the DNN for the wide-view image sensor is not required. In other embodiments, however, may omit a pre-trained DNN by training a DNN on projected—and/or virtually adjusted images (e.g., images with virtually-adjusted fields of view), without departing from the scope of the present disclosure.

In some embodiments, in order to accurately project highly distorted areas as captured in the image data, the field of view of the images represented by the image data may be virtually adjusted prior to applying the image data to a stereographic projection algorithm. For example, the field of view of the image sensor may be adjusted upwards (e.g., because parking image sensors or side-view image sensors may be angled downward and toward a ground plane). In some embodiments, the field of view may be adjusted (e.g., rotated) such that a virtual center of the image sensor substantially aligns with a horizon (e.g., a horizon of the real-world). For example, a rotation amount may be determined based on an analysis of a mounting angle of the image sensor, an analysis of various images captured using the image sensor, and/or other information. As such, a predetermined angle of adjustment may be determined for the virtual adjusted field of view. In some embodiments, this adjustment may correspond to substantially aligning a point (e.g., a camera center) on the image sensor with a horizon in the environment. In some embodiments, the horizon may correspond to a bounding line demarcating where a driving surface intersects the sky in an image. In such embodiments, the adjustment to the field of view may include, for one or more calibration images, adjusting the field of view until the point on the image sensor substantially aligns with a horizon as represented in the one or more calibration images. Once this alignment is determined, the angle of adjustment may be determined (e.g., by averaging the angle over any number of the calibration images), and the determined angle of adjustment may be used as the virtual adjustment to the field of view. By virtually adjusting the field of view, pixels in the highly distorted regions of the image where valuable information is represented may become less distorted, and portions of the image data where more information is available (e.g., a center of the image) may be more distorted—but the amount of information available at a center of the image even after distortion may be enough for accurate processing.

In addition, in some embodiments, the feature detections may be used to determine locations of the features and/or objects in world-space. In such examples, image-space locations may be converted to world-space locations using sensor calibrations—e.g., intrinsic and/or extrinsic properties of the sensors. The world-space locations of the features and/or objects may then be used by various other systems of the vehicle in performing path planning, obstacle avoidance, control decisions, and/or other autonomous or semi-autonomous operations.

As such, live perception of high field of view cameras may be leveraged to generate an understanding of a vehicle's environment using an existing DNN—e.g., without requiring retraining a DNN or training a new DNN. As such, the amount of compute power and manual effort required to perform object detection, feature detection, and/or other computations using the sensor data from a wide-view sensor may be drastically reduced as compared to conventional systems. In addition, even where a DNN is trained on the projected and/or virtually adjusted field of view images, the results may be more accurate and reliable as compared to conventional systems that attempt to train the DNN on non-projected and/or unadjusted fields of view.

Object and Feature Detection System

At a high level, sensor data (e.g., image data, LIDAR data, RADAR data, etc.) may be received and/or generated using sensors (e.g., cameras, RADAR sensors, LIDAR sensors, etc.) located or otherwise disposed on an autonomous or semi-autonomous vehicle. The sensors may be wide field of view sensors (e.g., sensors with a field of view equal to or greater than 120 degrees). The sensor data may be applied to a projection algorithm—e.g., a stereographic projection algorithm, a gnomonic projection algorithm, etc.—that is trained and/or programmed to generate projected sensor data representative of a projected image. Where a stereographic projection algorithm is used, the stereographic projection algorithm may project pixels of the sensor data onto a projection plane based on ray formulations over a virtual sphere depicting a field of view of the wide field of view sensor. The projected sensor data may be applied to a neural network (e.g., a deep neural network (DNN), such as a convolutional neural network (CNN)) that is trained to identify areas of interests pertaining to, as non-limiting examples, objects in the environment (e.g., vehicles, pedestrians, etc.), features of the environment (e.g., raised pavement markers, rumble strips, colored lane dividers, sidewalks, cross-walks, turn-offs, road layouts, objects, etc.), and/or semantic information (e.g., wait conditions, object types, lane types) pertaining thereto. In some examples, image-space locations of the detected objects or features may also be calculated by the DNN. As described herein, the DNN may be trained (e.g., pre-trained) with images or other sensor data representations captured from narrower field of view sensors (e.g., sensors with a field of view less than 120 degrees).

In some embodiments, gnomonic projection algorithms may be used to perform the projection of the sensor data to generate projected sensor data for use by the DNN. However, gnomonic projection may not be as accurate for wide-view sensors as gnomonic project may fail or be less reliable for fields of view greater than 90 degrees, where the projections of certain pixels on the image data may reach infinity on the target plane. As such, to account for this, subsets of the image data may be projected onto different planes to account for a wider field of view. However, such partial projection may be computationally expensive as at least four planes may be needed to cover the entire field of view. Further, features may end up with portions in different projected planes, thereby resulting in inaccurate outputs by the DNN.

As a result, in some embodiments, a stereographic projection algorithm may be used to project pixels of an image onto a target plane (e.g., a two-dimensional plane). A virtual sphere may be used as a virtual field of view of the sensor, and the lowest point on the virtual sphere may be used as a center of the projection to project the image onto the target plane. For each pixel of the target plane (e.g., projected image), a point on the sphere may be determined to be projected onto that pixel based on the intersection of a virtual line between the center of the projection and the pixel on the target plane with a point (e.g., pixel) on the virtual sphere. In this way, every pixel on the target plane or the projected image corresponds to a pixel sampled on the original image. By generating a projected image in this way, each original image is fully captured on a two-dimensional plane such that the projected image is invertible, where a feature detected by the neural network on the projected image may be retraced to the original image using a ray formulation to determine a location of the feature on the original image. Further, the stereographic projection algorithm may project images captured by wide field of view sensors onto a single plane, thereby comparatively reducing the computational expense compared to gnomonic projection techniques that divide the images into various portions and subsequently project the divided portions on multiple planes. The projected image may include a planar view of the original images captured by sensors with fields of view between 120 degrees and 360 degrees by preserving areas of interest that had the most distortion in the original, un-projected image.

In some examples, the sensor data may undergo pre-processing to virtually adjust the field of view of the wide field of view sensor to generate an updated image such as the most distorted—and potentially most informative—areas of the images (e.g., edges) may be relocated to areas of the virtual sphere where the pixel information is most preserved during projection. For example, the virtual field of view of the wide field of view sensor may be adjusted in a vertical direction such that the virtual center of the sensor substantially aligns with a horizon of the real world. In such examples, the virtual center of the image may be moved vertically upwards by rotating the virtual sphere by a pre-determined degree. The predetermined degree may be based on a sensor calibration and may be, as a non-limiting example, between 20 and 60 degrees. For example, depending on the location and angle of the sensor on the vehicle, the degree of rotation may be determined. In some examples, the virtual adjustment may be generated by rotating rays that form the original image by the predetermined degree when projecting the image onto the projected plane. The updated image may be applied to the stereographic projection algorithm to generate the projected image for applying to the DNN. Aligning the virtual center of the sensor with the horizon may allow the projection to be aligned with a constant for all sensor data generated by the sensor, and may allow for the edges of the images represented by the sensor data to be aligned with a central location on the virtual sphere for preserving the most informative pixels.

The projected image may be applied to the DNN—e.g., a pre-trained DNN—to detect objects, features, and/or semantic information corresponding thereto. The output of the DNN, in embodiments, may be used to accurately track objects as feature detection may be preserved at the edges of the images captured by wide field of view sensors—e.g., portions of the images that, without stereographic projection, may be the most distorted and thus the most difficult to make predictions with respect to.

Once the features and/or objects are detected, the locations corresponding thereto may be converted to their respective world-space locations. This may be accomplished using calibration information corresponding to the sensors, and may be based on adjustments (e.g., vertical rotation) to the sensor data during processing. As a result, the original mapping of the image-space locations to the world-space locations from the unprocessed sensor data may be recovered in order to prepare the outputs of the DNN for use by a vehicle in performing one or more operations.

With reference to FIG. 1A, FIG. 1A is an example data flow diagram illustrating an example process 100 for detecting features of a vehicle's environment using outputs from one or more sensors of the vehicle, in accordance with some embodiments of the present disclosure. It should be understood that this and other arrangements described herein are set forth only as examples, and the ordering of the components and/or processes may be adjusted without departing from the scope of the present disclosure. Further, additional or alternative components and/or processes others than those described herein may be implemented.

The process 100 may include a stereographic projector 106 executing a stereographic projection algorithm on one or more inputs (e.g., image data 102, other sensor data, etc.) and generating one or more outputs—such as projected image data 108. Further, the process 100 may include one or more machine learning model(s) 110 (e.g., DNNs) receiving one or more inputs (e.g., the projected image data 108, with or without a field of view adjustment from FOV adjuster 104) and generating one or more outputs 112. In some examples, when used for training, the image data 102 may be referred to as training image data. Although the image data 102 is primarily discussed with respect to image data representative of images, this is not intended to be limiting, and the image data 102 may include other types of sensor data used for feature and/or object detection, such as LIDAR data, SONAR data, RADAR data, and/or the like—e.g., as generated by one or more sensors of the vehicle 800 (FIGS. 8A-8D).

The process 100 may include generating and/or receiving image data 102 from one or more sensors. The image data 102 may be received, as a non-limiting example, from one or more sensors of a vehicle (e.g., vehicle 800 of FIGS. 8A-8C and described herein) captured by wide field of view sensors (e.g., sensors with fields of view greater than 120 degrees). The image data 102 may be used by the vehicle, and within the process 100, to detect and/or classify objects or features to aid navigation through the vehicle's environment in real-time or near real-time. The image data 102 may include, without limitation, image data 102 from any of the sensors of the vehicle including, for example and with reference to FIGS. 8A-8C, stereo camera(s) 868, wide-view camera(s) 870 (e.g., fisheye cameras), infrared camera(s) 872, surround camera(s) 874 (e.g., 360 degree cameras), and/or long-range and/or mid-range camera(s) 878. In some embodiments, in addition to or alternatively from the image data 102, sensor data from any number of sensor types may be used, such as, without limitation, RADAR sensor(s) 860, ultrasonic sensor(s) 862, LIDAR sensor(s) 864, and/or other sensor types. In some embodiments, as described herein, the image data 102 and/or the sensor data may be generated with sensors with sensory fields or fields of view that are greater than 120 degrees (e.g., 120 to 360 degrees). As another example, the image data 102 may include virtual image data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual image data may represent image data captured by the virtual sensors within the simulated or virtual environment.

In some embodiments, the image data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.) captured by wide field of view sensors (e.g., sensors with fields of view greater than 120 degrees). With respect to the image data 102, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the image data 102 may be used within the process 100 without any pre-processing (e.g., in a raw or captured format), while in other examples, the image data 102 may undergo pre-processing (e.g., any one or more of noise balancing, demosaicing, scaling, cropping, augmentation, white balancing, tone curve adjustment, etc., such as using a sensor data pre-processor (not shown)). As used herein, the image data 102 may reference unprocessed image data, pre-processed image data, or a combination thereof.

The image data 102 may include original images (e.g., as captured by one or more image sensors), down-sampled images, up-sampled images, cropped or region of interest (ROI) images, otherwise augmented images, and/or a combination thereof. In some embodiments, the machine learning model(s) 110 may be trained using the images (and/or other image data 102) captured using narrower field of view sensors (e.g., sensors with fields of view less than 120 degrees).

Figure 2:
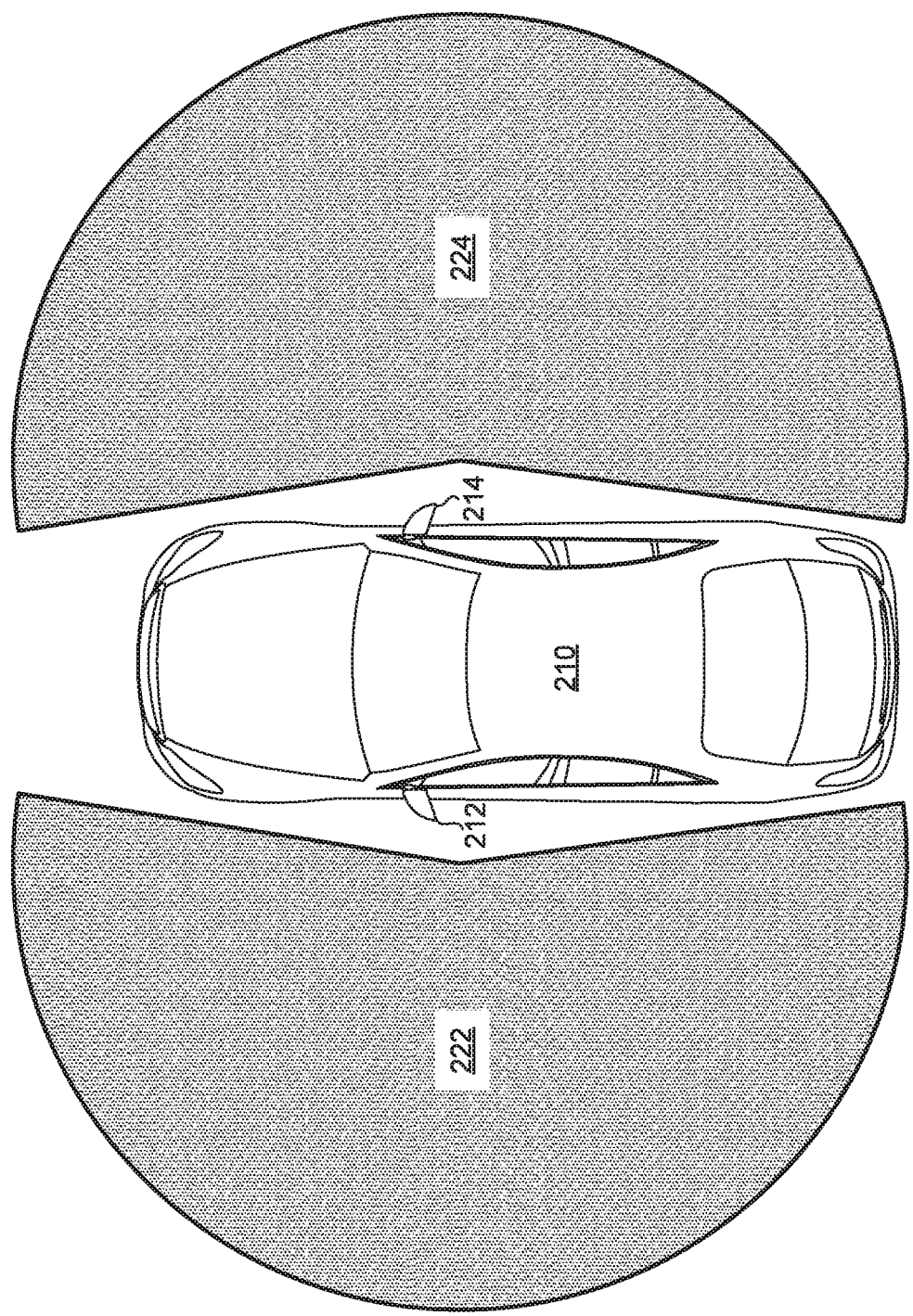
FIG. 2 depicts an illustration of example fields of view of wide field of view sensors on a vehicle, in accordance with some embodiments of the present disclosure.

As an example of fields of view that are greater than 120 degrees, and with reference to FIG. 2, FIG. 2 illustrates fields of view of wide field of view sensors on a vehicle, in accordance with some embodiments of the present disclosure. For example, vehicle 210 includes two wide field of view sensors, sensor 212 and sensor 214. Field of view 222 may correspond to the sensor 212 and may be approximately 190 degrees. Similarly, field of view 224 may correspond to the sensor 214 and may be approximately 190 degrees. The sensor 212 and the sensor 214 may each represent fisheye cameras (e.g., wide-view cameras 870 of the vehicle 800) of the vehicle 210. In some examples, one or both of the sensor 212 and the sensor 214 may be parking cameras used to assist the vehicle 210 for parking, or may include side-view cameras used for assisting the vehicle 210 for lane changes, blind-spot monitoring, and/or the like.

Referring again to FIG. 1A, during deployment, the image data 102 may be applied to the FOV adjuster 104, for example, to compute updated image data to be applied to the stereographic projector 106. In some examples, the image data 102 may undergo pre-processing to virtually adjust the field of view of the wide field of view sensor to generate the updated image data such that the most distorted—and potentially informative and important—areas of the images (e.g., edges) may be relocated to areas of the virtual sphere where the pixel information is most preserved during projection. For example, images captured using narrower field of view sensors may have minimal distortion near the edges of the field of view (e.g., as illustrated in image 310 of FIG. 3). However, images captured using higher field of view sensors often have heavy distortions at the edges, where there is lesser information available per pixel (e.g., as illustrated with in image 330 of FIG. 3).

For example, the FOV adjuster 104 may adjust the virtual field of view of the wide field of view sensor in a vertical direction—e.g., up or down. Due to the mounting angle of the sensors (e.g., facing downward for parking sensors and side-view sensors, facing upward for intersection analysis sensors, etc.), the field of view of the sensors may not be ideal for each implementation. For a non-limiting example, a parking sensor angled 40 degrees toward the ground may not have a field of view that is ideal for detecting vehicles in adjacent lanes or parked along a side of a street. However, it may still be advantageous to leverage the image data generated by the parking sensor angled downward for object or feature detection tasks. As such, the image data may be updated to represent a virtual field of view of the parking sensor that is angled at less than 40 degrees toward a ground surface—e.g., to 20 degrees, or 0 degrees. In some embodiments, as described herein, the field of view may be virtually adjusted such that a virtual center of the sensor substantially aligns with a horizon of the real world. In such examples, the virtual center of the images in the image data 102 may be moved vertically—e.g., upwards or downwards—by rotating a virtual sphere by a predetermined degree. The virtual sphere may be used as a virtual field of view of the wide field of view sensor used to capture the image data 102, and the updated image data representing the virtually adjusted field of view may be applied to the stereographic projector 106.

In some examples, the predetermined degree may be based on a sensor calibration and may be, as a non-limiting example, between 20 and 60 degrees. For example, the FOV adjuster 104 may determine the degree of rotation of the virtual sphere based on the location and angle of the sensor on the vehicle 800. In some examples, the virtual adjustment may be generated by rotating rays that form the original image of the image data 102 by the predetermined degree to generate the updated image. Aligning the virtual center of the wide field of view sensor with the horizon may allow for the edges of the images in the image data 102 to be aligned with a central location on the virtual sphere for preserving information where the most distortion is present in the un-adjusted image.

Figure 3:
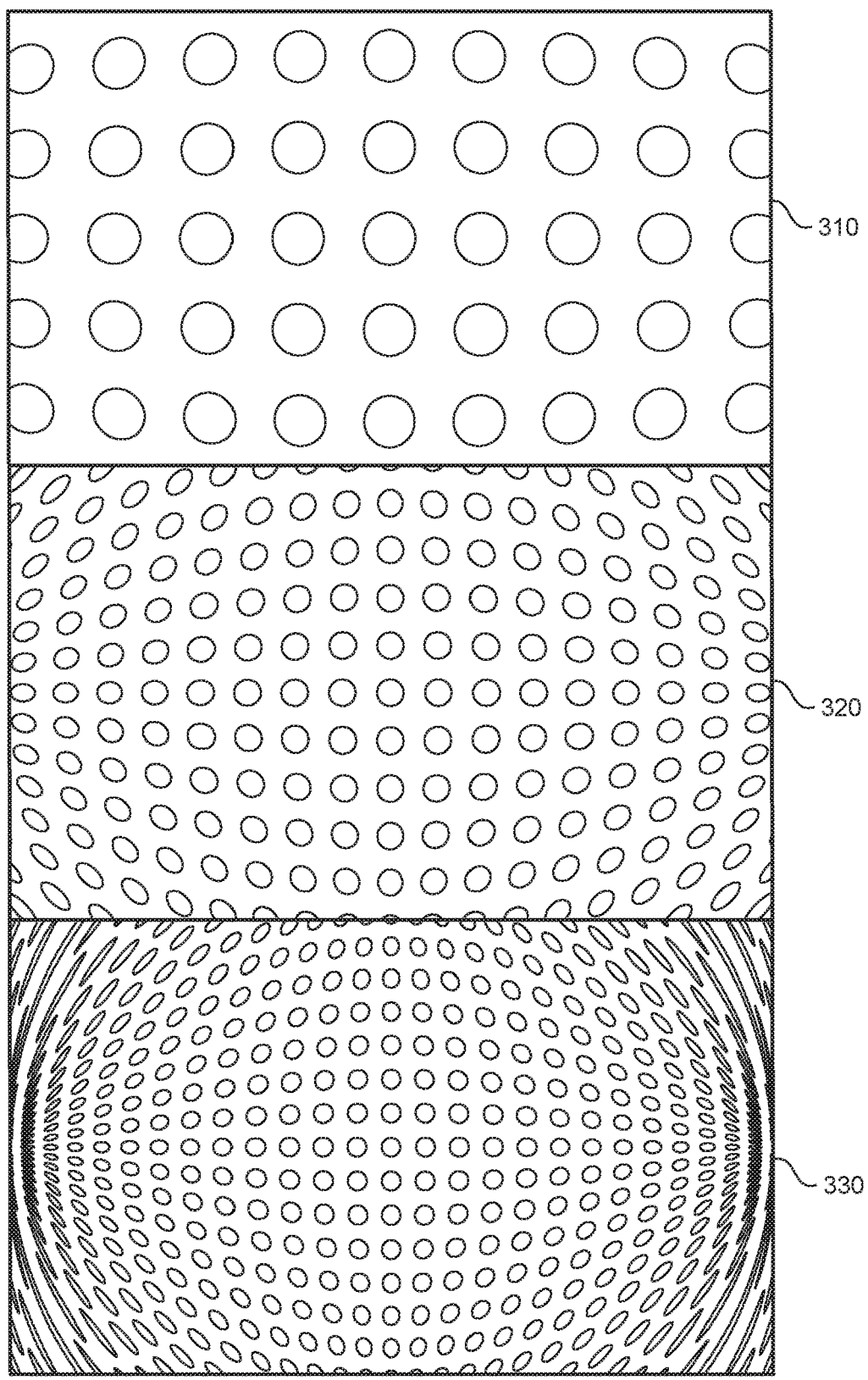
FIG. 3 depicts an illustration of example distortion representations corresponding to three sensors with different fields of view, in accordance with some embodiments of the present disclosure.

As another example, and with reference to FIG. 3, FIG. 3 illustrates images captured using three sensors with different fields of view, in accordance with some embodiments of the present disclosure. Image 310 is an image captured using a sensor having a horizontal field of view of sixty degrees. As can be seen in image 310, there are substantially no distortions in the image. Most machine learning models (e.g., machine learning model(s) 110) are trained to detect features using training images with a similar field of view as image 310. The machine learning models may be able to accurately and efficiently detect features in images such as image 310 due to the lack of distortion. Similarly, image 320 is an image captured using a sensor having a horizontal field of view of approximately 120 degrees. As the field of view increases, so does distortion at the edges of the images captured. As can be seen, the image 320 includes distortion on the right and left edges of the image. However, the image 320 may be almost entirely or substantially rectilinear, and the machine learning models may still be able to detect features accurately throughout the image 320 because information loss is still minimal in image 320. Image 330 is an image captured using a sensor having a field of view of 190 degrees. Pixels at the left and right edges of the image exhibit a higher level of distortion than the pixels in the middle of the image 330. Where machine learning models, such as machine learning model(s) 110, are trained using images captured by narrower field of view sensors (e.g., sensors with field of view less than 120 degrees), the machine learning models may not be able to detect features in the distorted regions, such as edges of the image 330, without pre-processing. As a result, the process 100 may be used to pre-process the images captured using fields of view closer to that represented in the image 330 such that the machine learning model(s) 110 (e.g., pre-trained on lower field of view images and/or trained on adjusted field of view or projected images) may accurately make predictions with respect to the image 330.

Figure 4:
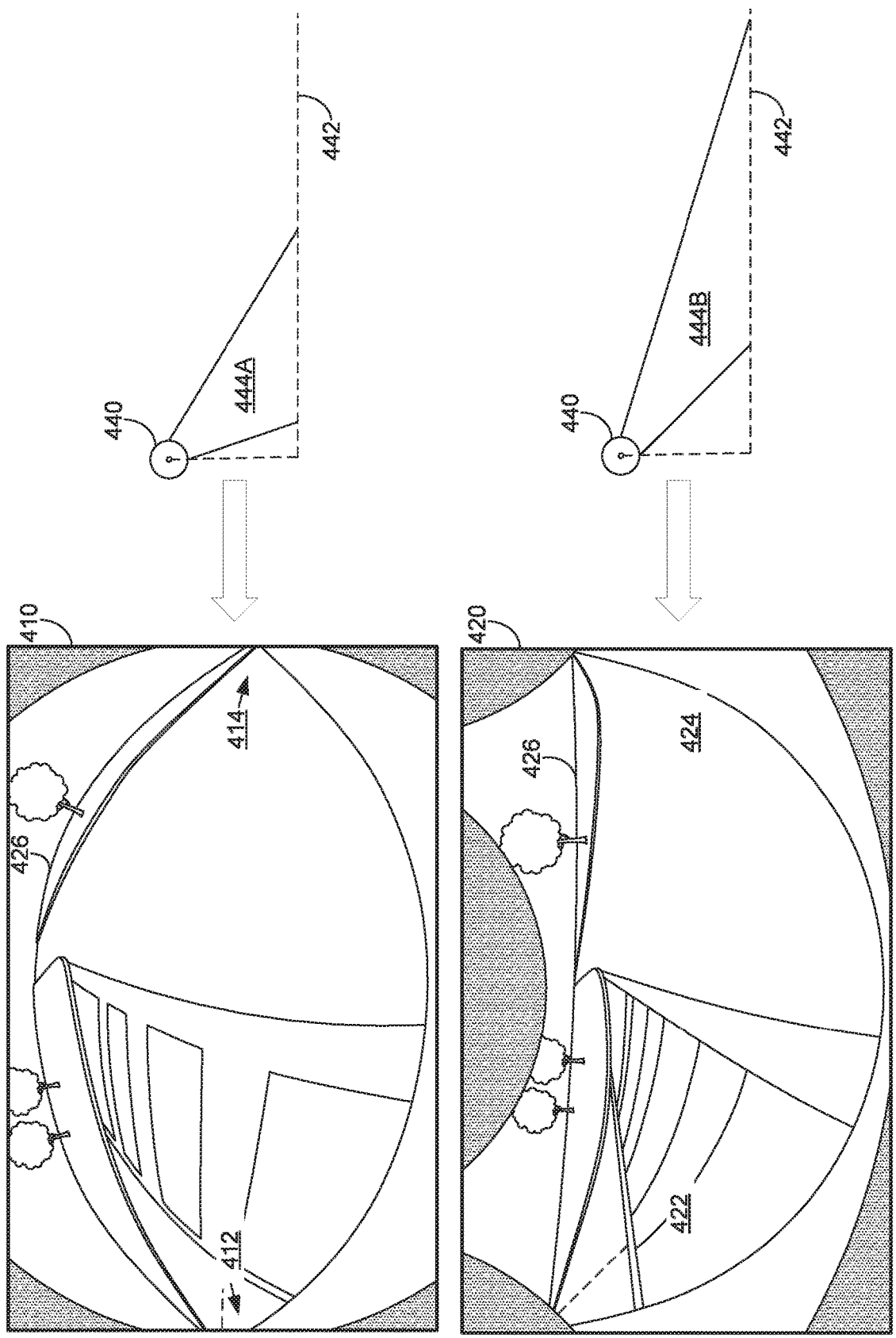
FIG. 4 depicts an illustration of an example image captured with a virtually adjusted using field of view, in accordance with some embodiments of the present disclosure.

As a further example, and with respect to FIG. 4, FIG. 4 illustrates a virtually adjusted image adjusted using the FOV adjuster 104, in accordance with some embodiments of the present disclosure. Image 410 may be an original image captured by a high field of view (e.g., greater than 120 degrees) sensor 440 of a vehicle (e.g., the vehicle 800). The FOV adjuster 104 of FIG. 1A may be used to virtually adjust a field of view 444A of the wide field of view sensor 440 that captured the image 410 to generate an updated image 422 such that the most distorted—and potentially informative—areas of the images (e.g., edges 412 and 414) may be relocated to areas (e.g., areas 422 and 424) of the virtual sphere where the pixel information is most preserved during projection. The updated image 420 may be generated by vertically adjusting the field of view 444A of the sensor 440 to an updated field of view 444B such that the virtual center of the sensor is virtually aligned with a different region in the real world than the actual alignment of the sensor in the real world—e.g., such as the horizon 426 of the real world. As can be seen, areas 422 and 424 of the updated image 420 preserve the pixel information from the edges 412 and 414 of the image 410. For example, the image 410 may captured by the wide field of view sensor 440 such that the center of the sensor is facing down towards the street or ground plane 442, and the virtual center of the sensor after adjustment in image 420 is facing more towards a horizon 426 (e.g., an intersection of a road or ground plane 422 with a sky in the distance). As such, by rotating the virtual center of the sensor upwards, the areas 422 and 424 with the most distortion in the image 410 may be updated such that the pixel information is preserved during projection using the stereographic projector 106.

Referring again to FIG. 1A, the updated image data (e.g., after field of view adjustment) and/or the image data 102 may be applied to the stereographic projector 106 that is trained and/or programmed to generate projected image data 108. The stereographic projector 106 may execute a stereographic projection algorithm, a gnomonic projection algorithm, and/or another type of projection algorithm. The stereographic projector 106 may project pixels of the image data 102 onto a two-dimensional (2D) projection plane (e.g., target plane) based on ray formulation over a virtual sphere depicting a field of view of the wide field of view sensor used to capture the image data 102. A virtual sphere may be used as the field of view of the wide field of view sensor, and each pixel of the image data 102 may be projected onto the 2D projection plane. The projected image data 108 may be representative of a projected image.

In some examples, the stereographic projector 106 may use a gnomonic projection algorithm (and may alternatively be referred to as a "gnomic projector" or "projector") to generate the projected image data 108. A center of the virtual sphere may be used as a center of the projection to project the image data 102 onto the 2D projection plane. For each pixel of the 2D projection plane (e.g., projected image data 108), a point on the virtual sphere may be determined to be projected onto that pixel based on the intersection of a virtual line between the center of the projection and the pixel on the target plane with a point (e.g., pixel) on the virtual sphere. In this way, every pixel on the target plane or the projected image data 108 may correspond to a pixel sampled on the original image of the image data 102. However, gnomonic projection algorithm may fail to project pixels in fields of view greater than 90 degrees, leaving the rest of the pixels of an image captured from a sensor with a field of view greater than 90 degrees outside the 2D projection plane as the projections for those pixels of the image data 102 may reach to infinity without intersecting the 2D projection plane. In such examples, subsets of the image data 102 may be projected onto separate 2D projection planes to account for a wider field of view (e.g., field of view greater than 90 degrees). The separate 2D projection planes may be used as projected image data 108 to be applied to machine learning model(s) 110 to detect features and/or objects. However, such partial and multiple projection may be computationally expensive as at least four projection planes may be required to cover the entire field of view of the image data 102. Further, a single feature or object may end up with portions represented across different projected planes, thereby resulting in difficulty for the machine learning model(s) 110 to predict such features and/or objects.

In other examples, the stereographic projector 106 may use a stereographic projection algorithm to generate the projected image data 108 by projecting pixels of an image of the image data 102 or the updated image data onto a single 2D projection plane. In such examples, the virtual sphere may be used as a virtual field of view of the sensor, and the lowest (e.g., vertically lowest) point on the virtual sphere may be used as the center of the projection to project image data 102 onto the 2D projection plane (e.g., as illustrated in FIGS. 1A and 1B). For each pixel of the 2D projection plane, a point on the virtual sphere may be determined to be projected onto that pixel based on the intersection of a virtual line between the center of the projection and the pixel on the 2D projection plane with a point (e.g., pixel) on the virtual sphere. In this way, every pixel on the 2D projection plane or the projected image of the projected image data 108 may correspond to a pixel sampled on the original image of the image data 102 and/or the updated image data. By generating a projected image in this way, each original image represented by the image data 102 and/or the updated image represented by the updated image data may be fully captured on a two-dimensional plane such that the projected image is invertible, where a feature detected by the machine learning model(s) 110 on the projected image may be retraced to the original image of image data 102 using a ray formulation to determine a location of the feature on the original image of the image data 102. As non-limiting examples, FIG. 1B illustrates—among other things—how an original image may be projected onto a 2D projection plane, using a virtual sphere, to generate projected image data 108.

Further, the stereographic projector 106 may use the stereographic projection algorithm to project images of image data 102 captured by wide field of view sensors onto a single plane, thereby comparatively reducing the computational expense compared to gnomonic projection techniques that divide the images into various portions and subsequently project the divided portions on multiple planes. The projected image in projected image data 102 may include a planar view of the original images of the image data 102 captured by sensors with fields of view between 120 degrees and 360 degrees by preserving areas of interest that had the most distortion in the original, unprojected image. Specifically, the FOV projector 104 may move the distorted portions (e.g., edges) of the image data 102 to positions in the updated image data such that the distorted portions in the updated image data are located in areas where the stereographic projector 106 is configured to preserve more information. While the non-distorted portions of the image data 102 may be located in regions where the stereographic projector 106 may not be configured to preserve as much information, the image data 102 itself includes more information in those areas (e.g., center) of the image such that the machine learning model(s) 110 may still be able to accurately predict features in such regions even with the information loss. For example, with reference to FIG. 5, object (or vehicle) 514 may appear distorted after projection but, due to the number of pixels corresponding to the object 514, the object 514 may still be accurately detected and/or classified by the machine learning model(s) 110.

As an example of stereographic projection, and with reference to FIG. 1B, FIG. 1B illustrates how an original image may be projected onto a 2D projection plane, using a virtual sphere, to generate a projected image, in accordance with some embodiments of the present disclosure. A virtual sphere 120 is used as a virtual field of view of the sensor that captured an image represented in the outline of the sphere, and the lowest (e.g., vertically lowest) point on the virtual sphere is used as the center 122 of the projection to the image onto the target plane 118. For each pixel of the target plane, a point on the virtual sphere is determined to be projected onto that pixel based on the intersection of a virtual line between the center 122 of the projection and the pixel on the target plane 118 with a point (e.g., pixel) on the virtual sphere. For example, point 128 on the virtual sphere 120 is determined to be projected onto pixel 130 of the target plane 118 based on the intersection of the virtual line 126 between the center 122 and the pixel 130. Similarly, points 134, 140, 144, and 150 on the virtual sphere are projected onto pixels 136, 140, 146, and 152, respectively, of the target plane 118 based on the intersections of the virtual lines 132, 138, 142, and 148, respectively, between the center 122 and the respective pixels. As such, every pixel on the target plane

118 may correspond to a pixel sampled on the original image to generate a projected image.

Referring again to FIG. 1A, the projected image data 108 may be applied to a machine learning model(s) 110 trained to detect output(s) 112 from the image data 102—e.g., after field of view adjustments and/or projection. The machine learning model(s) 110 may use the projected image data 108 to compute the output(s) 112, which may be applied to a decoder or one or more post-processing components (e.g., output converter) to generate information regarding the environment of the vehicle 800. The machine learning model(s) may be trained to identify areas of interest (e.g., as one of the output(s) 112) pertaining to the environment of the vehicle 800. For example, the areas of interest, and subsequently the output(s) 112, may include objects (e.g., vehicles, pedestrians, stop signs, etc.), features (e.g., raised pavement markers, rumble strips, colored lane dividers, sidewalks, cross-walks, turn-offs, road layouts, etc.), and/or semantic information (e.g., classifications, wait conditions, object types, lane types, etc.) pertaining thereto. In some examples, the machine learning model(s) 110 may further be trained to determine image-space locations of the detected object or features. In some embodiments, as described herein, the machine learning model(s) 110 may be trained (e.g., pre-trained) with images or other sensor data representations captured from narrower field of view sensors (e.g., sensors with a field of view less than 120 degrees).

Although examples are described herein with respect to using deep neural networks (DNNs), and specifically convolutional neural networks (CNNs), as the machine learning model(s) 110, this is not intended to be limiting. For example, and without limitation, the machine learning model(s) 110 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of machine learning models.

As an example, such as where the machine learning model(s) 110 include a CNN, the machine learning model(s) 110 may include any number of layers. One or more of the layers may include an input layer. The input layer may hold values associated with the image data 102 and/or projected image data 108 (e.g., before or after post-processing). For example, when the image data 102 and/or the projected image data 108 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 110, and some or all of the convolutional streams may include a respective fully connected layer(s).

In some non-limiting embodiments, the machine learning model(s) 110 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 110, this is not intended to be limiting. For example, additional or alternative layers may be used in the machine learning model(s) 110, such as normalization layers, SoftMax layers, and/or other layer types.

In embodiments where the machine learning model(s) 110 includes a CNN, different orders and numbers of the layers of the CNN may be used depending on the embodiment. In other words, the order and number of layers of the machine learning model(s) 110 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 110 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 5:
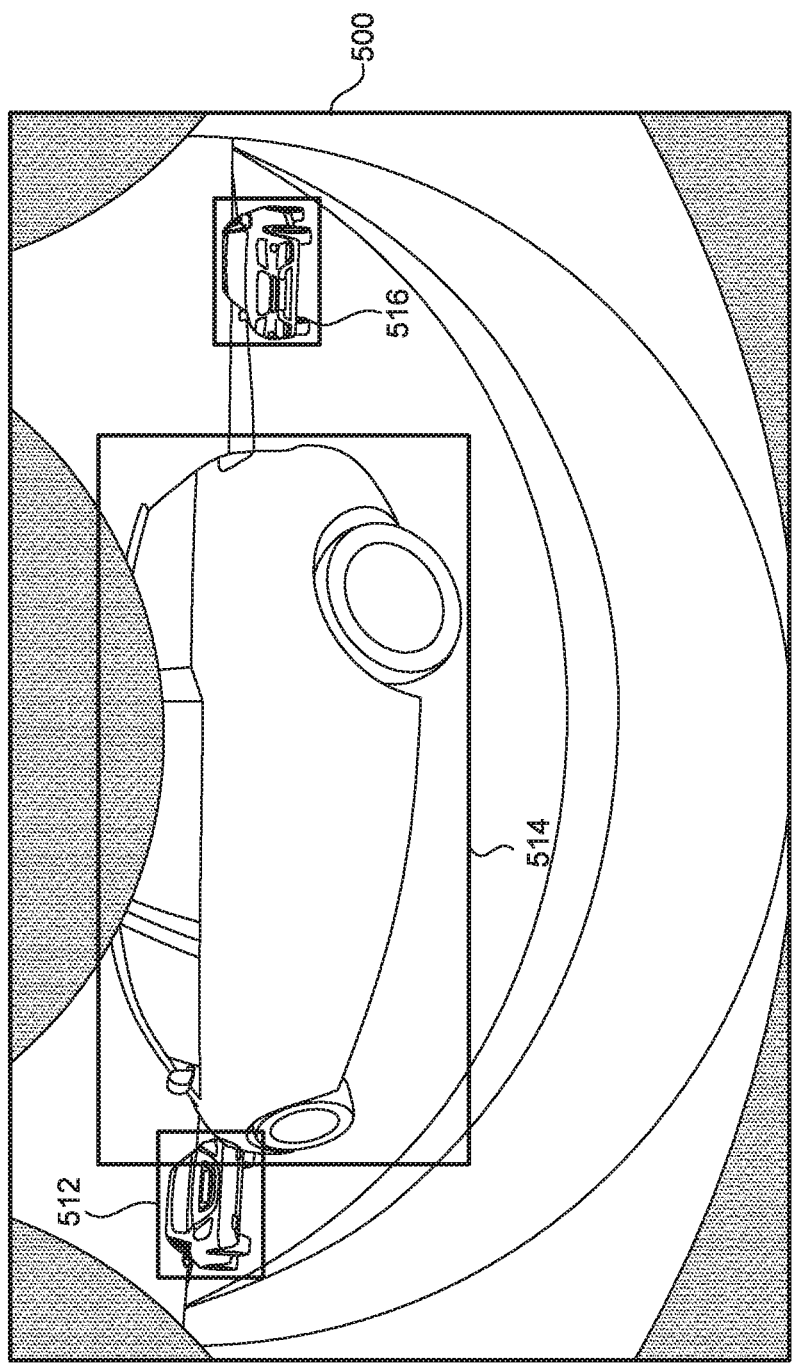
FIG. 5 depicts an illustration of example object detections in a projected image, in accordance with some embodiments of the present disclosure.

As an example of the outputs 112, and with reference to FIG. 5, FIG. 5 illustrates object detections in an image using a neural network, in accordance with some embodiments of the present disclosure. Image 500 may represent an image captured by a wide field of view sensor (e.g., a sensor with a field of view greater than 120 degree, fisheye camera, wide-view camera 870, surround camera 874, parking assist camera, etc.) of a vehicle, such as the vehicle 800 of FIGS. 8A-8D. The machine learning model(s) 110 of FIG. 1A, as described herein, may be used to detect objects 512, 514, and 516 in the image 500. The stereographic projector 106 may be used to project the image 500 onto a 2D target plane prior to applying the projected image data 108 of FIG. 1B to the machine learning model(s) 110. In some non-limiting embodiments, the machine learning model(s) 110 may be trained using images captured from narrower field of view sensors (e.g., sensors with fields of view less than 120 degrees). In this way, existing machine learning models may be leveraged to detect features in images captured from a different field of view than the training images without requiring re-training of the machine learning model(s) 110. Further, as a result of the adjusted fields of view and/or the projection, features and/or objects may be detected even in the distorted regions of the original images prior to field of view adjustment and/or projection—e.g., the regions of the image corresponding to the objects (e.g., vehicles) 512 and 516. As such, the portions of the original image that may have the most distortion but represent important information—e.g., locations of objects 512 and 516—may be less distorted and the portions of the original image without distortion (e.g., portions corresponding to the object 514) may have more distortion but still maintain enough pixels representative thereof that the machine learning model(s) 110 may still accurately predict the outputs 112 corresponding thereto.

Referring again to FIG. 1A, in some examples, the output(s) 112 may be applied to an output converter 114 to post-process the output(s) 112 of the machine learning model(s) 110. In some examples, once the features are detected in output(s) 112 of the machine learning model(s) 110, the locations corresponding to the features may be converted or mapped to their respective world-space locations. The output converter 114 may use calibration information corresponding to the sensors (e.g., intrinsic and/or extrinsic parameters, such as a sensor model, a location and orientation of the sensor on the vehicle 800, focal length, lens distortion, pose, etc.) that captured the image data 102 and/or the adjustments (e.g., vertical rotation) made by the FOV adjuster 104 to the image data 102 during processing to convert the image-space locations from the output(s) 112 to world-space locations. As a result, the original mapping of the image-space locations to the world-space locations from the unprocessed sensor data may be recovered in order to prepare the output(s) 112 of the machine learning model(s) 110 for use by control component(s) 116 of the vehicle 800 in performing one or more operations.

In some embodiments, the output(s) 112 of the machine learning model(s) 110 may be used to accurately track objects. For example, because the feature detections may be preserved at the edges of the images of the image data 102 captured by wide field of view sensors that are originally distorted, the objects or features may be accurately tracked throughout the entire field of view (e.g., including portions of the images that, without stereographic projection, may be the most distorted and thus the most difficult to make predictions with respect to). The output(s) 112, including features and/or objects in the environment, may be tracked in subsequent images of the image data 102 and, in some examples, temporal analysis may be used to track the features, from when they are detected at one edge of a field of view through to another edge of the field of view. As such, where tracking is executed, the output converter 114 may use the real-world converted outputs of the objects and/or features to generate a location or movement history corresponding thereto.

Once the output(s) 112 are determined and/or converted, this information may be passed to control component(s) 116 of the system to perform one or more operations. For example, where the system is the vehicle 800, described herein, the output(s) 112 and/or converted outputs may be passed to one or more layers of an autonomous driving software stack (e.g., a planning layer, a control layer, a world-model manager, a perception layer, an obstacle avoidance layer of the drive stack, an actuation layer of the drive stack, etc.) to determine an appropriate control decision. As such, the control component(s) 116 may make control decision that may include suggesting one or more of path planning, obstacle avoidance, and/or control decisions— such as where to stop, how fast to drive, what path to use to safely traverse the environment, where other vehicles or pedestrians may be located, and/or the like. In any example, and with respect to autonomous or semi-autonomous driving, the control decisions may include any decisions corresponding to a perception layer of the drive stack, a world model management layer of the drive stack, a planning layer of the drive stack, a control layer of the drive stack, an obstacle avoidance layer of the drive stack, an actuation layer of the drive stack, and/or another layer, feature, or function of a drive stack. In some examples, the process 100 may be executed on any number of machine learning model(s) 110 operating within a system. For example, an autonomous driving software stack may rely on hundreds or thousands of machine learning model(s) 110 for effective and safe operation, and any number of these may be subject to the process 100 in order to ensure safe and effective operation while leveraging sensors having larger fields of view (e.g., greater than 120 degrees). As such, as described herein, the process 100 may be separately performed for any number of different operations corresponding to one or more layers of the drive stack and using any number of machine learning model(s) 110. As an example, a first detection may be determined for object detection operations with respect to the perception layer of the drive stack using a first machine learning model, and a second detection may be determined for path planning with respect to the planning layer of the drive stack using a second machine learning model trained for regressing on lane lines.

Figure 6:
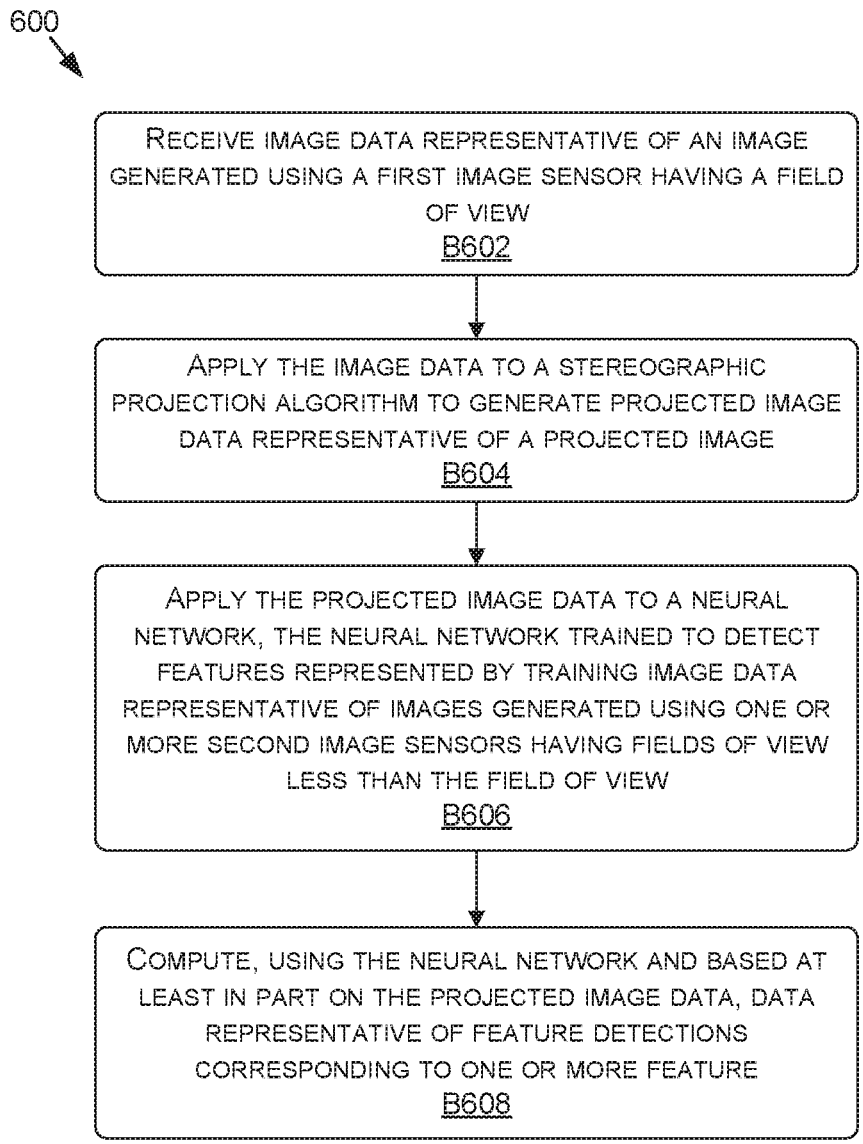
FIG. 6 is a flow diagram illustrating an example process for detecting features in images captured by wide field of view sensors using an existing neural network trained on images captured using narrower field of view sensors, in accordance with some embodiments of the present disclosure.
Figure 7:
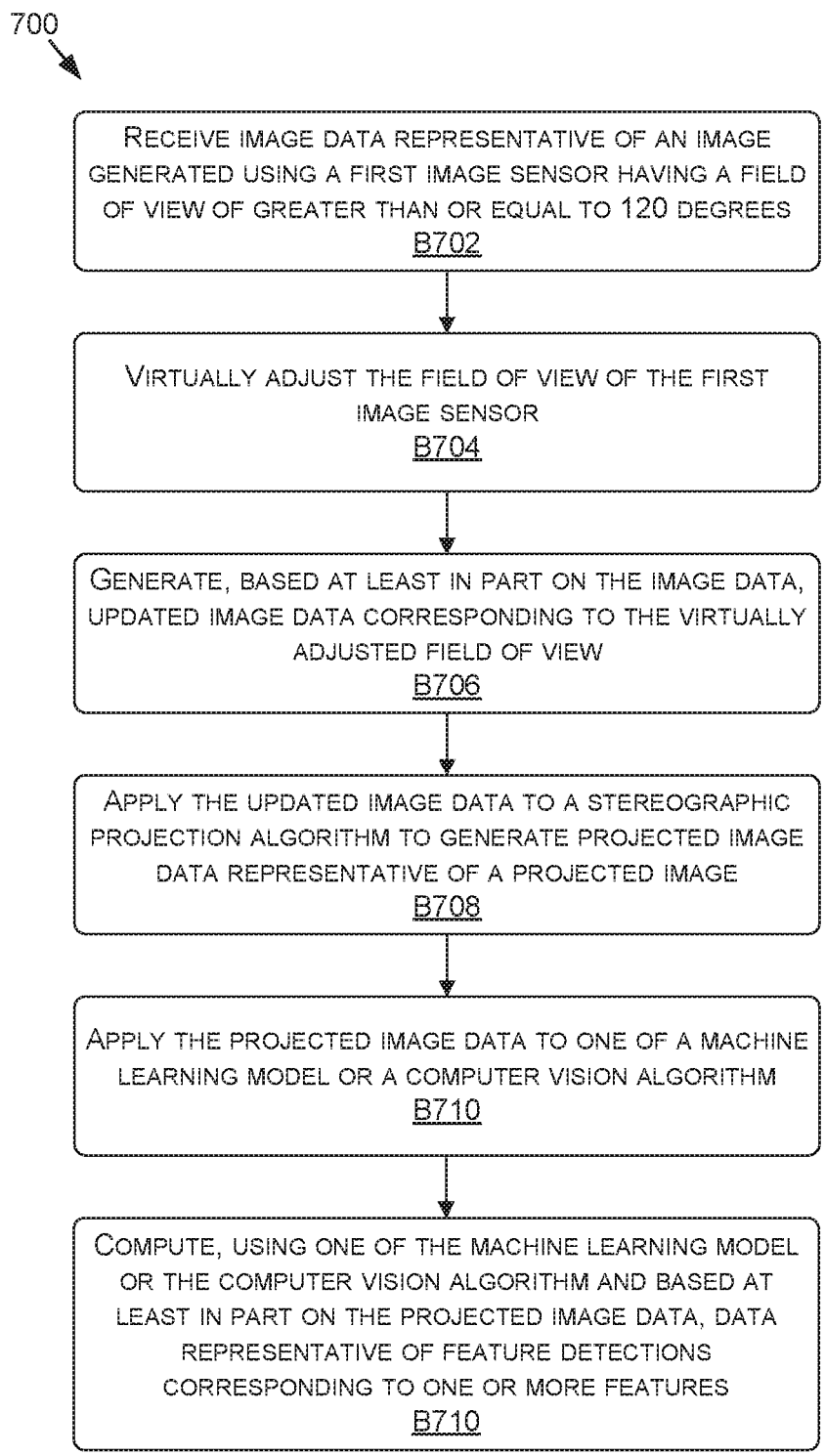
FIG. 7 is a flow diagram illustrating an example process for detecting features in virtually adjusted projected images captured by wide field of view sensors, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, the methods 600 and 700 are described, by way of example, with respect to the process 100 of FIG. 1A and the vehicle 800 of FIGS. 8A-8D. However, these methods may additionally or alternatively be executed by any one system or within any one process, or any combination of systems and processes, including, but not limited to, those described herein.

Now referring to FIG. 6, FIG. 6 is a flow diagram showing a method 600 for detecting features in images captured by wide field of view sensors using an existing neural network trained on images captured using narrower field of view sensors, in accordance with some embodiments of the present disclosure. The method 600, at block B602, includes receiving image data representative of an image generated using a first image sensor having a field of view. For example, the image data 102 may be received, where the image data 102 represents an image captured from a wide field of view sensor (e.g., a sensor having a field of view of 120 degree or more).

The method 600, at block B604, includes applying the image data to a stereographic projection algorithm to generate projected image data representative of a projected image. For example, the image data 102 may be applied to the stereographic projector 106 that executes a stereographic projection algorithm to generate the projected image data 108 representative of a projected image generated by projecting pixels of the image data 102 onto a 2D projection or target plane.

The method 600, at block B606, includes applying the projected image data to a neural network, the neural network trained to detect features represented by training image data representative of images generated using one or more second image sensors having fields of view less than the field of view. For example, the projected image data 108 may be applied to the machine learning model(s) 110 that is trained to detect and/or classify features and/or objects represented by training image data representative of images generated using narrower field of view sensors (e.g., sensors having fields of view less than 120 degrees).

The method 600, at block B608, includes computing, using the neural network and based at least in part on the projected image data, data representative of feature detections corresponding to one or more features. For example, the machine learning model(s) 110 may compute output(s) 112 based on the projected image data 108. The output(s) 112 may include data representative of feature and/or object detections corresponding to one or more features in the projected image data 108.

Referring now to FIG. 7, FIG. 7 is a flow diagram showing a method 700 for detecting features in images captured by wide field of view sensors, in accordance with some embodiments of the present disclosure. The method 700, at block B702, includes receiving image data representative of an image generated using a first image sensor having a field of view of greater than or equal to 120 degrees. For example, the image data 102 may be received, where the image data represents an image captured from a wide field of view sensor (e.g., a sensor having a field of view of 120 degree or more).

The method 700, at block B704, includes virtually adjusting the field of view of the first image sensor. For example, the FOV adjuster 104 may virtually adjust the field of view of the image sensor used to capture the image data 102.

The method 700, at block B706, includes generating, based at least in part on the image data, updated image data corresponding to the virtually adjusted field of view. For example, updated imaged data may be generated by the FOV adjuster 104 that corresponds to the virtually adjusted field of view.

The method 700, at block B708, includes applying the updated image data to a stereographic projection algorithm to generate projected image data representative of a projected image. For example, the updated image data may be applied to the stereographic projector 106 that executes a stereographic projection algorithm to generate projected image data 108 representative of a projected image generated by projecting pixels of the updated image data onto a 2D projection or target plane.

The method 700, at block B710, includes applying the projected image data to one of a machine learning model or a computer vision algorithm. For example, the projected image data 108 may be applied to the machine learning model(s) 110.

The method 700, at block 712, includes computing, using one of the machine learning model or the computer vision algorithm and based at least in part on the projected image data, data representative of feature detections corresponding to one or more features. For example, the machine learning model(s) 110 may compute output(s) 112 based on the projected image data 108. The output(s) 112 may include data representative of feature and/or object detections or classifications corresponding to one or more features and/or objects represented by the projected image data 108.

Example Autonomous Vehicle

Figure 8A:
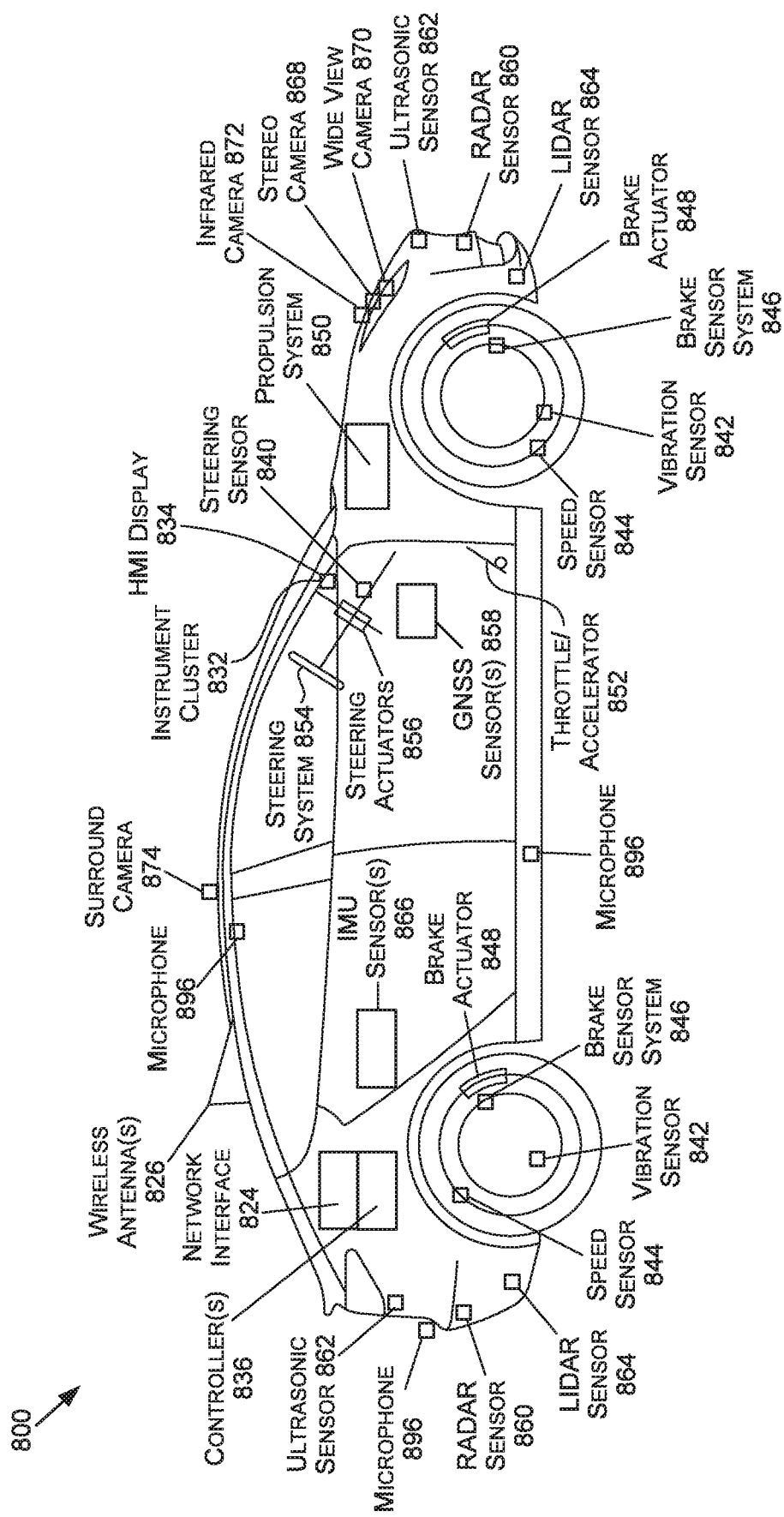
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
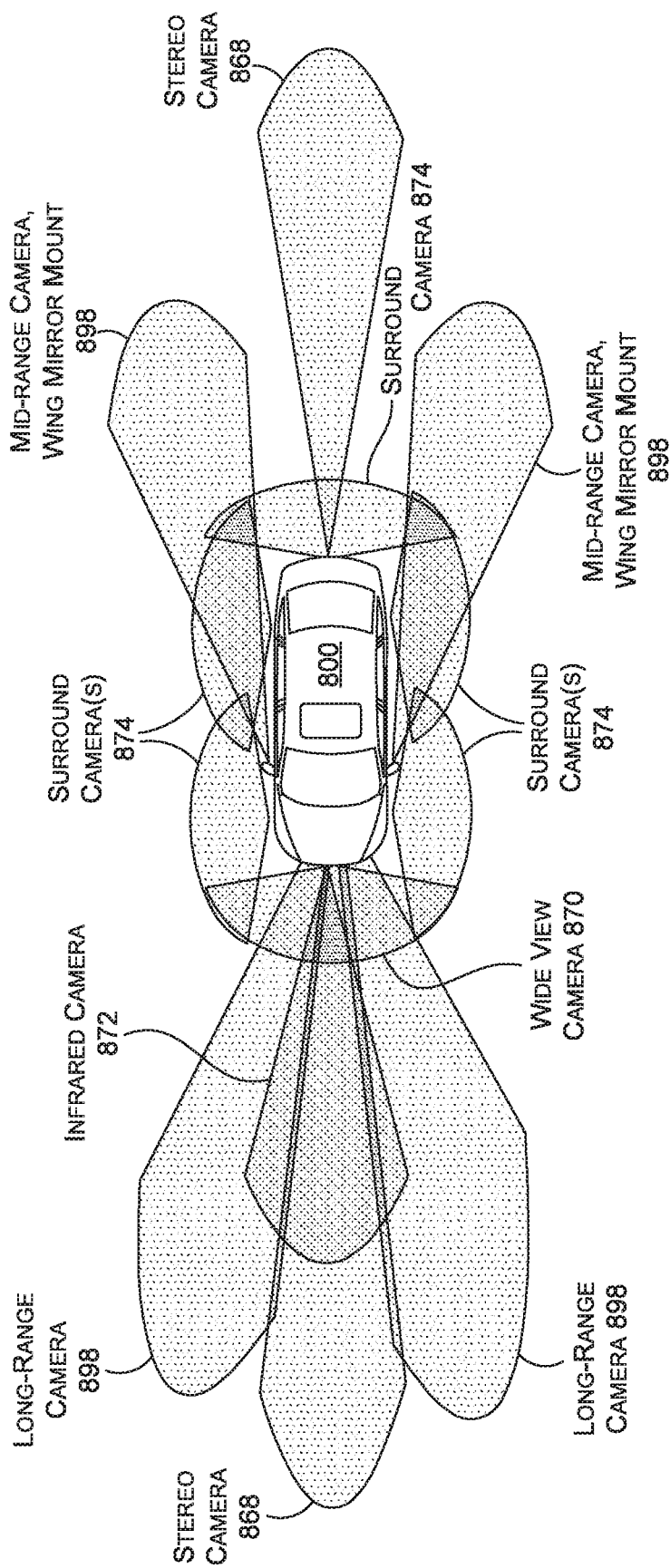
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 820 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing camems may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
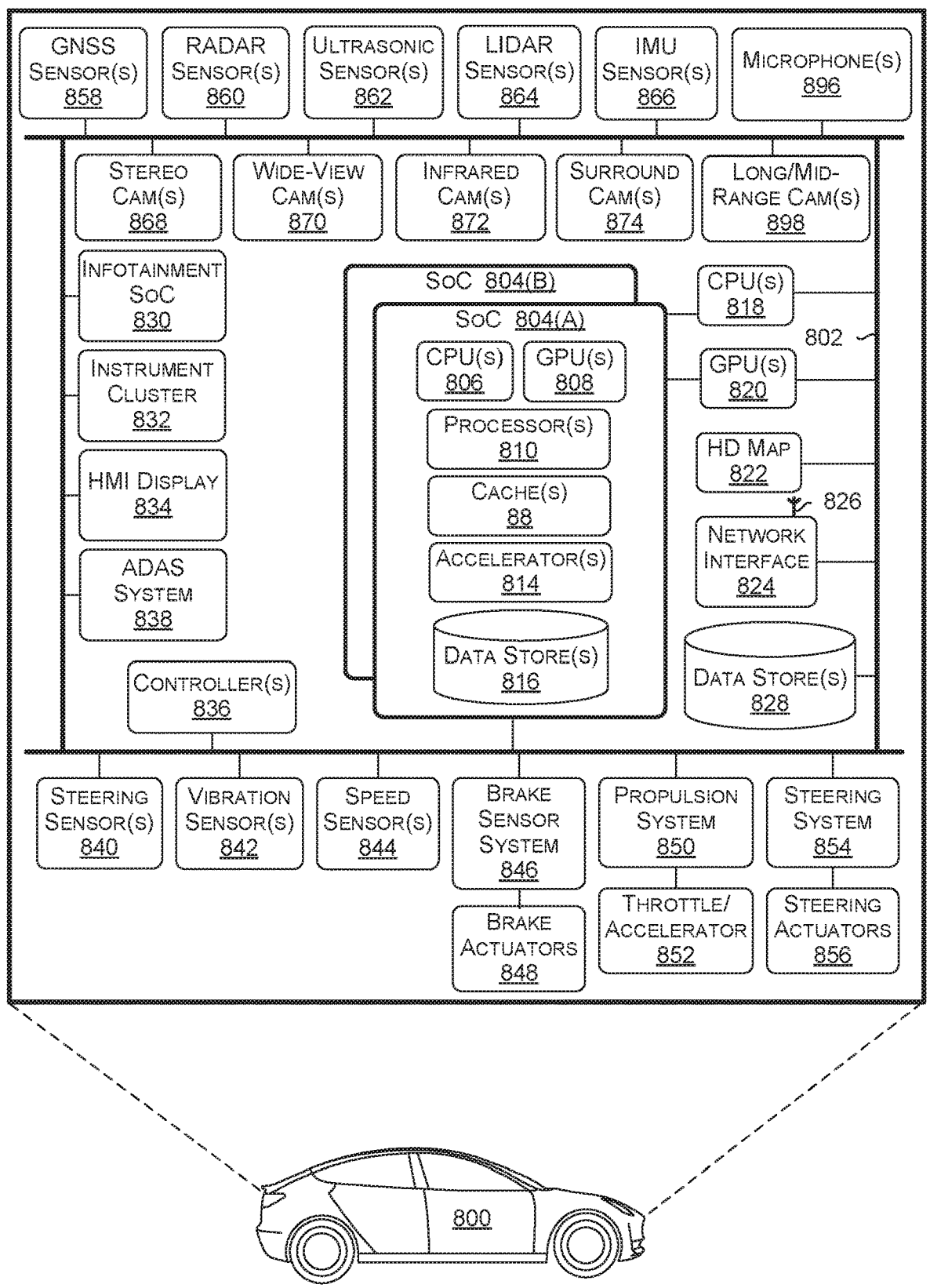
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS and/or assisted GPS sensors), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 820-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
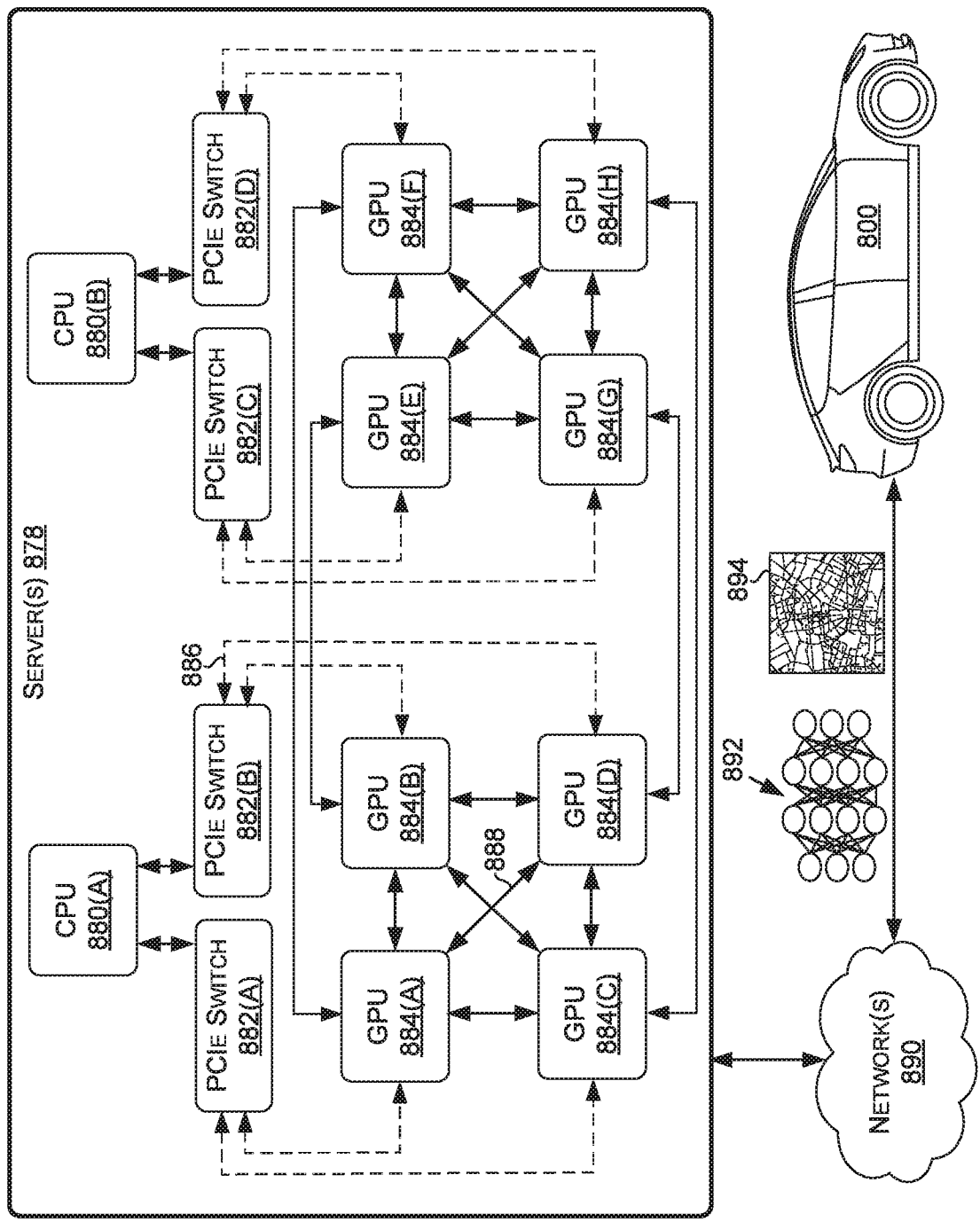
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
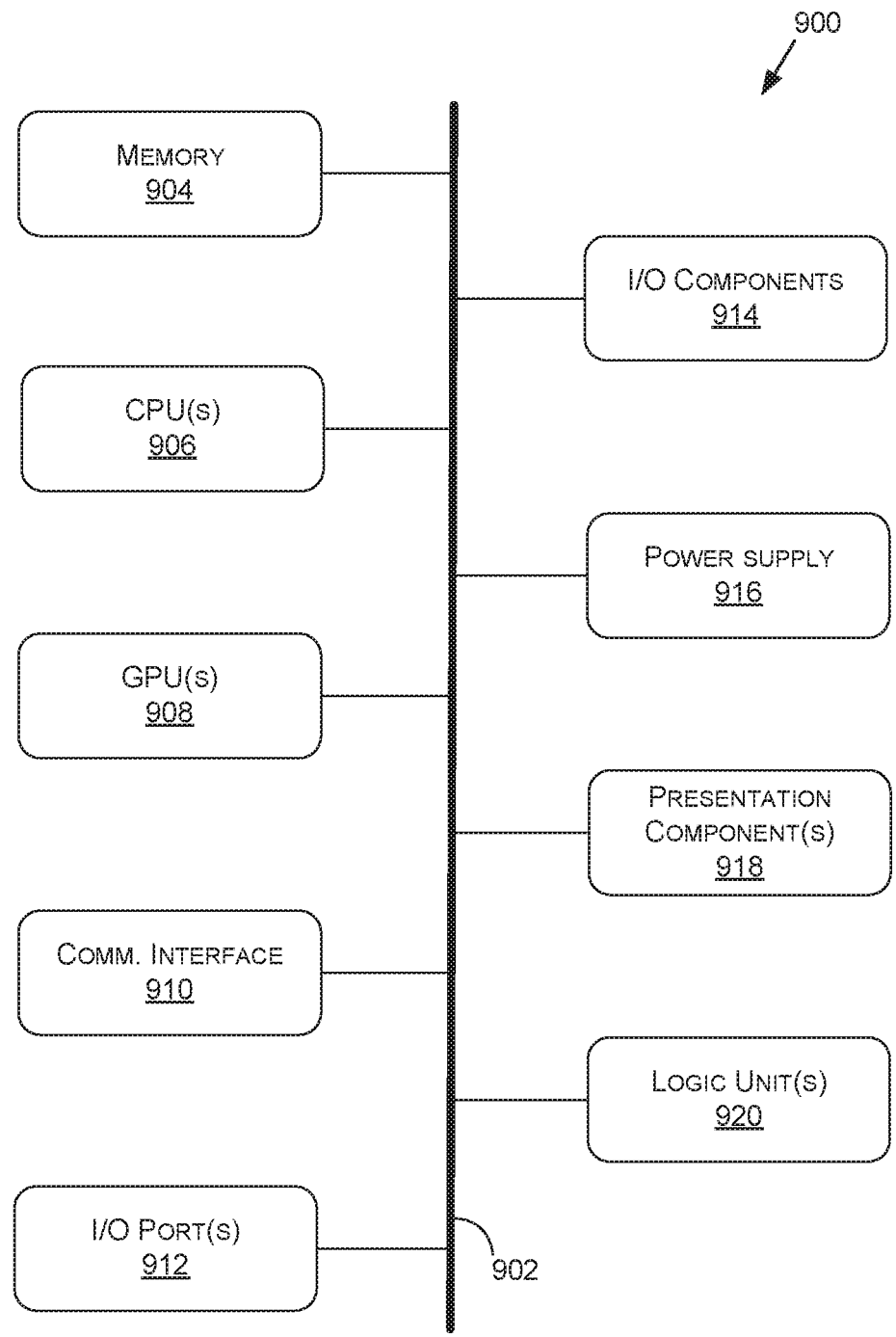
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    receiving image data representative of an image generated using a first image sensor having a first field of view;
    generating a modified image having a second field of view by, at least in part, virtually adjusting the first field of view to substantially align a virtual center associated with the first image sensor to a horizon in the first field of view;
    generating, based at least on a stereographic projection algorithm and the modified image, a projected image;
    applying the projected image to a neural network, the neural network trained to detect features represented by training image data representative of images generated using one or more second image sensors having one or more fields of view different from the first field of view; and computing, using the neural network and based at least in part on the projected image, data representative of feature detections corresponding to one or more features.

2. The method of claim 1, wherein the virtually adjusting includes virtually rotating the first field of view by an angle that corresponds to a mounting angle of the first image sensor relative to the horizon.

3. The method of claim 1, wherein the images are generated using one or more second image sensors having the one or more fields of view.

4. The method of claim 3, wherein the virtually adjusting includes virtually rotating the first field of view along at least a vertical direction by a predetermined degree.

5. The method of claim 1, wherein the method further comprises:

converting the feature detections to respective image-space locations corresponding to the image; and determining, from the image-space locations, corresponding world-space locations of the one or more features corresponding to the feature detections.

6. The method of claim 1, wherein the horizon corresponds to a bounding line demarcating where a driving surface intersects a sky in the image.

7. A method comprising:

receiving image data representative of an image generated using an image sensor having a field of view;

virtually rotating the field of view of the image sensor to generate updated image data having an adjusted field of view by at least modifying the image data to substantially align a virtual center corresponding to the image sensor with a region in the field of view;

applying the updated image data to a stereographic projection algorithm to generate projected image data representative of a projected image;

applying the projected image data to a model; and computing, using the model and based at least in part on the projected image data, data representative of feature detections corresponding to one or more features.

8. The method of claim 7, wherein the model is trained based at least in part on training image data representative of images generated using one or more image sensors having fields of view less than a number of degrees of the field of view.

9. The method of claim 7, further comprising sending the data representative of feature detections to a component of a vehicle at least for use by the vehicle in navigating a driving surface.

10. The method of claim 7, wherein the virtually rotating includes vertically rotating the field of view in an upwards direction.

11. The method of claim 7, wherein the virtually rotating includes rotating a virtual sphere associated with the field of view of the image sensor by a number of degrees.

12. The method of claim 7, wherein the stereographic projection algorithm projects pixels of the updated image data onto a two-dimensional (2D) target plane to generate the projected image.

13. The method of claim 12, wherein a projected pixel of the projected image data corresponds to a pixel of the updated image data based at least in part on an intersection of a line with the pixel of the updated image data corresponding to a sphere pixel, the line connecting a lowest point of a sphere associated with the image sensor and a corresponding projected pixel on the 2D target plane.

14. The method of claim 7, wherein the data corresponds to the projected image data, and the method further comprises:

converting the feature detections to respective image-space locations corresponding to the image; and determining, from the image-space locations, corresponding world-space locations of the one or more features corresponding to the feature detections.

15. The method of claim 7, wherein the field of view is greater than or equal to 120 degrees.

16. The method of claim 7, wherein the model implements a computer vision algorithm.

17. A system comprising:

an image sensor having a field of view greater than 120 degrees and oriented at a first angle with respect to ground plane;

a computing device including one or more processing devices and one or more memory devices communicatively coupled to the one or more processing devices storing programmed instructions thereon, which when executed by the one or more processing devices causes instantiation of:

a field of view adjuster to:

virtually adjust the field of view of the image sensor based at least on the first angle to generate updated image data having an adjusted field of view corresponding to the image sensor oriented at a second angle with respect to the ground plane by at least modifying image data generated using the image sensor to virtually align the image sensor with a region in the field of view;

a projector to apply the updated image data to a stereographic projection algorithm to generate projected image data representative of a projected image; and a feature detector to:

apply the projected image data to a machine learning model; and compute, using the machine learning model and based at least in part on the projected image data, data representative of feature detections corresponding to one or more features represented in the projected image.

18. The system of claim 17, wherein the machine learning model is trained based at least in part on training image data representative of images generated using one or more image sensors having fields of view less than the field of view.

19. The system of claim 17, wherein the data corresponds to the projected image data, and the system further comprises an output converter to:

convert the feature detections to respective image-space locations corresponding to an image represented by the image data; and determine, from the image-space locations, corresponding world-space locations of the one or more features corresponding to the feature detections.

20. The system of claim 19, wherein the field of view is greater than 180 degrees.

* * * * *